United States Patent [19]
DeRenzo

[11] Patent Number: 5,409,619
[45] Date of Patent: Apr. 25, 1995

[54] IRONING AID COMPOSITION

[75] Inventor: Jacqueline DeRenzo, Ramsey, N.J.

[73] Assignee: Reckitt & Colman Inc., Wayne, N.J.

[21] Appl. No.: 110,429

[22] Filed: Aug. 23, 1993

[51] Int. Cl.$^6$ ............... D06M 13/08; D06M 13/17; D06M 13/148

[52] U.S. Cl. .................. 252/8.6; 252/170; 252/173

[58] Field of Search ............ 252/8.6, 170, 73, 173

[56] References Cited

U.S. PATENT DOCUMENTS

| | | | |
|---|---|---|---|
| 77,138 | 4/1868 | Warren | 252/8.6 |
| 1,213,368 | 1/1917 | Hibbert | 252/73 |
| 1,742,349 | 1/1930 | Haag | 252/73 |
| 1,780,927 | 11/1930 | Jordan | 252/73 |
| 1,852,891 | 4/1932 | Whitehead | 252/8.6 |
| 2,590,659 | 3/1952 | Skalkeas | 252/8.6 |
| 2,740,727 | 4/1956 | Littleton | 117/55 |
| 3,131,153 | 4/1964 | Klausner | 252/305 |
| 3,928,609 | 12/1975 | Behrakis | 424/253 |
| 3,932,125 | 1/1976 | Wasley et al. | 8/128 R |
| 4,138,565 | 2/1979 | Ehrhardt et al. | 544/346 |
| 4,238,057 | 12/1980 | Matsunaga et al. | 222/192 |
| 4,294,821 | 10/1981 | Neumiller | 424/45 |
| 4,314,805 | 2/1982 | McKnight | 8/137 |
| 4,399,245 | 8/1983 | Kicher et al. | 524/108 |
| 4,552,564 | 11/1985 | DeBoer et al. | 8/115.6 |
| 4,806,254 | 2/1989 | Church | 252/8.6 |
| 4,861,593 | 8/1989 | Spearman et al. | 424/195.1 |
| 4,893,422 | 1/1990 | Mahlich et al. | 38/77.3 |

FOREIGN PATENT DOCUMENTS

| | | | |
|---|---|---|---|
| 150531 | 8/1985 | European Pat. Off. | |
| 23792 | 2/1979 | Japan | |
| 172798 | 7/1988 | Japan | |
| 115497 | 5/1991 | Japan | |
| 391785 | 5/1933 | United Kingdom | |
| 975605 | 11/1964 | United Kingdom | |
| 2114619 | 8/1983 | United Kingdom | |
| 11522 | 11/1989 | WIPO | |
| 9119037 | 12/1991 | WIPO | D06M 15/643 |

Primary Examiner—Paul Lieberman
Assistant Examiner—Michael P. Tierney
Attorney, Agent, or Firm—Frederick H. Rabin

[57] ABSTRACT

An ironing aid composition for use in the steam chamber of a steam iron comprises propylene glycol, glycerine and optionally a volatile fragrance. The composition can be used drop-wise in concentrated form or can be diluted with water.

6 Claims, No Drawings

IRONING AID COMPOSITION

FIELD OF THE INVENTION

This invention relates to an ironing aid composition which is suitable for pouring directly into the well of a steam iron, the composition being released through the steam vents of the iron. In one aspect, the invention relates to a liquid concentrated ironing aid additive to be poured, along with water, into the steam chamber. In another aspect, the invention relates to an aqueous composition containing the ironing aid ingredients of said concentrated additive, said composition designed to be poured into the steam chamber in place of the distilled water or tap water.

BACKGROUND OF THE INVENTION

Garments, particularly those produced from natural cotton, wool or linen fibers, often wrinkle badly when washed and require considerable time and effort with an iron to restore them to satisfactory wrinkle-free appearance. In the last half-century, textile manufacturers have developed so called wash-and-wear garments with "permanent press" characteristics. Garments manufactured from these fabrics have considerably less tendency to wrinkle in the washing process and, as a result, the need to iron such garments has been significantly reduced. Nevertheless, there remain some wrinkling problems in wash-and-wear garments and these problems are more severe when the directions for care have not been followed. For example, a garment may tend to wrinkle when the wash water is too hot, when the garment is dried at an excessively high temperature or not removed immediately from the dryer. Under such circumstances, it is often necessary to do some touch-up ironing with a steam iron. Also, garments made from fibers containing all cotton or a high percentage of cotton (70% or more) continue to be manufactured since many wearers prefer such garments over those containing cross-linking resins or blends of cotton and synthetic fibers. Such garments are subject to wrinkling during the laundering process and therefore almost always require ironing. Ironing of garments is a tedious task and it is, of course, desirable to ease the effort to the extent possible. Most of the ironing aids heretofore available are in the form of spray starches or sizing products offered in conventional aerosol or trigger spray delivery systems. For example, U.S. Pat. No. 4,238,057 discloses a spray-type sizing composition comprising a modified low viscosity starch and, to make the iron move smoothly during the ironing operation, a minor amount of dipropylene glycol is added. PCT Patent Publication No. WO91/19037 discloses the use of a silicone gel for ease of ironing and improvement in the appearance of ironed garments.

U.S. Pat. No. 4,806,254 is principally concerned with a wrinkle-removing spray composition comprising a low molecular weight alcohol, glycerine and a nonionic surfactant, with the only essential ingredient being glycerine. There is a statement that use of the composition may make ironing easier but no indication that the composition can be introduced into the chamber of a steam iron.

The principal object of this invention to develop an ironing aid composition which, rather than being spayed onto garments, can be used in the steam chamber (well) of a steam iron.

SUMMARY OF THE INVENTION

This invention provides a ironing aid composition comprising from about 60% to about 95% propylene glycol, from about 5% to about 40% of glycerins and from 0% to about 10% of a volatile fragrance. A concentrated composition of this type can be added, along with water, to the chamber of a steam iron in sufficient amount so that steam chamber contains from about 0.4% to about 10% of the ironing aid composition. Alternatively, the ingredients of the ironing aid composition can be added to water, thus forming an aqueous composition suitable for pouring directly into the steam chamber. Such aqueous compositions contain from about 0.2% to about 5% of propylene glycol, from about 0.1% to about 3% of glycerins, and optionally up to about 0.5% of a volatile fragrance.

DETAILED DISCLOSURE

The ironing aid composition of this invention is a liquid composition designed for introduction into the steam chamber (well) of a conventional domestic steam iron. The liquid composition is capable of use in a variety of ways, for example (1) as a concentrate intended to be added drop-wise into the steam chamber simultaneously with the addition of water, or (2) diluted with distilled water in a composition which to be introduced into the steam chamber in place of ordinary distilled water or tap water.

The ironing aid composition of this invention comprises, by weight, from about 60% to about 95% of propylene glycol, from about 5% to about 40% of glycerine and optionally up to about 10% of a volatile fragrance. Preferably, the ironing aid composition comprises from 70% to 90% propylene glycol, from 10% to 30% glycerine and optionally up to 5% of fragrance. Propylene glycol and glycerine are completely volatile and leave no residue behind in the steam chamber. If it is intended to incorporate a fragrance into the ironing aid composition, the fragrance should be a liquid fragrance which, like the other ingredients, completely volatizes at or slightly below the boiling point of water, thereby leaving behind no residue.

The concentrated ironing aid composition according to this invention is introduced in a small amount—for example, drop-wise—into the steam chamber of an iron, most conveniently simultaneously with the introduction of ordinary distilled water or tap water. The amount of concentrated ironing aid composition in the steam chamber should be in the range of about 0.4% to about 10%, preferably about 1% to about 5%. The concentrated ironing aid composition according to this invention can be dispensed by means of a dropper arrangement which provides substantially accurate measurements, the volume of the dropper dose being set with regard to the volume of the steam chamber.

For most domestic purposes, it will be more convenient to take advantage of the second aspect of this invention, namely an aqueous composition containing the ingredients of the concentrated ironing aid composition. More particularly, the aqueous composition comprises from about 0.2% to about 5% of propylene glycol, from 0.1% to about 3% of glycerine, optionally up to about 0.5% of a volatile fragrance, and from about 92% to about 99.7% water. Preferably, the aqueous composition contains from 1% to 3% propylene glycol, from 0.2% to 1% glycerine, optionally up to 0.2% fragrance and from 96% to 98.8% water. Among advantages deriving from aqueous compositions of this type is that the user of the composition will be employing distilled water, rather than tap water, thereby avoiding the deposit of mineral salts which can clog the vents of a steam iron. Although manufacturers of steam irons regularly advise the use of distilled water, this advice is very seldom heeded.

Ironing with an ironing aid composition according to this invention provides improved glide characteristics and thereby eases the task of ironing.

This invention will be better understood by reference to the following examples, which are included here for illustrative purposes only and are not intended as limitations.

EXAMPLE 1

12.5 grams of propylene glycol and 2.5 grams of glycerine were mixed together and 485 grams of distilled water then added to the mixture, resulting in a solution containing 2.0 weight % propylene glycol and 0.5% weight glycerine. 10 grams of this solution were placed in a beaker and then boiled to evaporation. No residue was left behind in the beaker, thereby indicating that the composition would not clog the vents of a steam iron.

EXAMPLE 2

135 grams of the solution of example 1 were poured into the well of a steam iron. A panel consisting of 15 persons were then requested to iron creases of 100% cotton T-shirt material having the approximate dimensions of 18 cm by 35 cm, with said aqueous composition and with said steam iron filled with 135 grams of distilled water. Twelve of the panelists reported that ironing was easier with the use of the aqueous composition of this invention. Two of the panelists reported that ironing was easier with pure distilled water. One panelist reported no difference in the compositions' effects.

The compositions of this invention are not limited to the precise details and specific examples disclosed. Various changes may be made therein without departing from the spirit of the invention which is defined by the following claims.

I claim:

1. A method for improving the efficiency of a steam iron which comprises introducing into the steam chamber of said iron an aqueous composition consisting essentially of about 0.2% to about 5% of propylene glycol, from about 0.1% to about 3% of glycerine, from 0 to about 0.5% of a volatile fragrance and from about 92% to about 99.7 % water.

2. A method according to claim 1 in which the composition consists essentially of from 1% to 3% propylene glycol, from 0.2 to 1% glycerine, from 0 to 0.2% fragrance, and from 96% to 98.8% water.

3. A method according to claim 2 in which the aqueous composition consists essentially of about 2.5% propylene glycol, about 0.5% glycerine and about 97.5% water.

4. A method for removing wrinkles from garments which comprises ironing said garments with a steam iron whose chamber contains an aqueous composition consisting essentially of about 0.2% to about 5% of propylene glycol, from about 0.1% to about 3% of glycerine, from 0 to about 0.5% of a volatile fragrance and from about 92% to about 99.7% water.

5. A method according to claim 4 in which the composition consists essentially of from 1% to 3% propylene glycol, from 0.2 to 1% glycerine, from 0 to 0.2% fragrance, and from 96% to 98.8 % water.

6. A method according to claim 5 in which the aqueous composition consists essentially of about 2.5% propylene glycol, about 0.5% glycerine and about 97.5% water.

* * * * *